US008398487B2

(12) United States Patent   (10) Patent No.: US 8,398,487 B2
Izumi   (45) Date of Patent: Mar. 19, 2013

(54) GAME DEVICE, METHOD OF CONTROLLING GAME DEVICE, PROGRAM, AND INFORMATION STORAGE MEDIUM

(75) Inventor: Tadakatsu Izumi, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 174 days.

(21) Appl. No.: 12/918,723

(22) PCT Filed: Dec. 24, 2008

(86) PCT No.: PCT/JP2008/073427
§ 371 (c)(1),
(2), (4) Date: Aug. 20, 2010

(87) PCT Pub. No.: WO2009/104341
PCT Pub. Date: Aug. 27, 2009

(65) Prior Publication Data
US 2010/0317440 A1    Dec. 16, 2010

(30) Foreign Application Priority Data

Feb. 20, 2008   (JP) ................................. 2008-038222

(51) Int. Cl.
*A63F 13/00* (2006.01)
(52) U.S. Cl. .......... 463/36; 463/4; 463/1; 463/9; 463/30
(58) Field of Classification Search .................. None
See application file for complete search history.

(56) References Cited

U.S. PATENT DOCUMENTS

| 6,431,982 B2 * | 8/2002 | Kobayashi ................ 463/4 |
| 2004/0018897 A1 * | 1/2004 | Nelson ................ 473/415 |
| 2005/0070349 A1 * | 3/2005 | Kimura ................ 463/4 |
| 2005/0119072 A1 * | 6/2005 | Pettey ................ 473/470 |
| 2008/0113833 A1 * | 5/2008 | Fernandez ................ 473/471 |
| 2010/0099469 A1 * | 4/2010 | Tsurumoto ................ 463/1 |

(Continued)

FOREIGN PATENT DOCUMENTS

| GB | 2439644 A | 1/2005 |
| JP | 3736589 B2 | 8/1998 |

(Continued)

OTHER PUBLICATIONS

Chinese Office Action corresponding to Chinese Patent Application No. 2008-80119600.2, dated Jul. 4, 2012.

(Continued)

*Primary Examiner* — Paul A D'Agostino
(74) *Attorney, Agent, or Firm* — Sughrue Mion, PLLC (57) ABSTRACT

Provided is a game device which allows a reduction in processing load relating to the control of player characters belonging to one team, in a case where any one of player characters belonging to another team is in possession of a moving object. A selecting section (52a) selects one or more player characters from among player characters belonging to the team which is not in possession of a moving object. A player character control section (52) controls such that the player character selected by the selecting section (52a) approaches the moving object. In a case where the moving object or the player character in possession of the moving object is located within a restriction region, a restricting section (56) imposes a restriction on the control to be executed by the player character control section (52). A restriction region control section (54a) changes the size of the restriction region based on game situation information.

6 Claims, 7 Drawing Sheets

U.S. PATENT DOCUMENTS

| | | | |
|---|---|---|---|
| 2010/0160011 A1* | 6/2010 | Izumi et al. | 463/1 |
| 2010/0178968 A1* | 7/2010 | Mori | 463/9 |
| 2010/0234103 A1* | 9/2010 | Matsumaru | 463/30 |
| 2010/0331080 A1* | 12/2010 | Taya | 463/30 |

FOREIGN PATENT DOCUMENTS

| | | |
|---|---|---|
| JP | 2004-202007 A | 7/2004 |
| JP | 2005-000248 A | 1/2005 |
| JP | 2006-122407 A | 5/2006 |
| JP | 2007259988 A | 10/2007 |
| WO | 2008/018513 A1 | 2/2008 |

OTHER PUBLICATIONS

European Search Report corresponding to European Patent Application No. 08872696.3, dated May 3, 2011.

* cited by examiner

FIG.5

| SCORE DIFFERENCE | REFERENCE DISTANCE |
|---|---|
| −2 OR LESS | D1 |
| −1 | D2 |
| 0 | D3 |
| +1 | D4 |
| +2 OR MORE | D5 |

GAME DEVICE, METHOD OF CONTROLLING GAME DEVICE, PROGRAM, AND INFORMATION STORAGE MEDIUM

TECHNICAL FIELD

The present invention relates to a game device, a method of controlling a game device, a program, and an information storage medium.

BACKGROUND ART

There is known a game device which executes a game (sport game) of a sport to be performed between a first team and a second team using a moving object such as a ball. For example, a game device which executes a soccer game, a basketball game, or an ice hockey game is known. In such a game device, when a player character belonging to one team is in possession of the moving object, a player character belonging to the other team is controlled to defend against the player character in possession of the moving object.
Patent Document 1: JP 2005-000248 A

DISCLOSURE OF THE INVENTION

Problems to be Solved by the Invention

In a game device as described above, it is necessary, in a case where a player character belonging to one team is in possession of a moving object, to achieve a reduction in processing load relating to the control of a player character belonging to the other team.

The present invention has been achieved in view of the problem described above, and an object thereof is to provide a game device, a method of controlling a game device, a program, and an information storage medium which, in a case where a player character belonging to one team is in possession of a moving object, allow a reduction in processing load relating to the control of a player character belonging to the other team.

Means for Solving the Problems

To solve the above-mentioned problem, a game device according to the present invention is a game device for executing a game of a sport to be performed between a first team and a second team using a moving object. The game device includes: game situation information storing means for storing game situation information indicating a game situation; selecting means for selecting one or more player characters from among player characters belonging to one team, in a case where any one of player characters belonging to another team is in possession of the moving object; player character control means for controlling a position of the player character selected by the selecting means, based on a position of the moving object or of the player character in possession of the moving object so that the player character selected by the selecting means approaches the moving object or the player character in possession of the moving object; determining means for determining whether or not the moving object or the player character in possession of the moving object is located within a restriction region; and restricting means for imposing a restriction on the control to be executed by the player character control means, in a case where the moving object or the player character in possession of the moving object is located within the restriction region, wherein the determining means includes restriction region control means for changing a size of the restriction region based on the game situation information.

Also, a game device control method according to the present invention is a control method of controlling a game device for executing a game of a sport to be performed between a first team and a second team using a moving object. The control method includes: a step of reading out stored content stored in game situation information storing means storing game situation information indicating a game situation; a step of selecting one or more player characters from among player characters belonging to one team, in a case where any one of player characters belonging to another team is in possession of the moving object; a player character control step of controlling a position of the player character selected at the selecting step based on a position of the moving object or of the player character in possession of the moving object so that the player character selected at the selecting step approaches the moving object or the player character in possession of the moving object; a determining step of determining whether or not the moving object or the player character in possession of the moving object is located within a restriction region; and a restricting step of imposing a restriction on the control to be executed at the player character control step, in a case where the moving object or the player character in possession of the moving object is located within the restriction region, wherein the determining step includes a restriction region control step of changing a size of the restriction region based on the game situation information.

Also, the program according to the present invention is a program for causing a computer, such as a consumer game machine (stationary type game machine), a portable game machine, a commercial game machine, a mobile phone, a personal digital assistant (PDA), or a personal computer, to function as a game device for executing a game of a sport to be performed between a first team and a second team using a moving object. The program causes the computer to function as: game situation information storing means for storing game situation information indicating a game situation; selecting means for selecting one or more player characters from among player characters belonging to one team, in a case where any one of player characters belonging to another team is in possession of the moving object; player character control means for controlling a position of the player character selected by the selecting means based on a position of the moving object or of the player character in possession of the moving object so that the player character selected by the selecting means approaches the moving object or the player character in possession of the moving object; determining means for determining whether or not the moving object or the player character in possession of the moving object is located within a restriction region; and restricting means for imposing a restriction on the control to be executed by the player character control means, in a case where the moving object or the player character in possession of the moving object is located within the restriction region, wherein the determining means includes restriction region control means for changing a size of the restriction region based on the game situation information.

An information storage medium according to the present invention is a computer readable information storage medium storing the above-mentioned program. A program distribution device according to the present invention is a program distribution device which includes the information storage medium storing the above-mentioned program, reads out the above-mentioned program from the information storage medium, and distributes the program. A program distribution method according to the present invention is a program distribution method which reads out the above-mentioned program from the information recording medium storing the above-mentioned program, and distributes the program.

The present invention relates to a game device which executes a game (sport game) of a sport to be performed between the first team and the second team using the moving object. According to the present invention, the game situation information indicating the game situation is stored. In a case where any one of the player characters belonging to one team is in possession of the moving object, one or more player characters are selected from among the player characters belonging to the other team. The position of the selected character is controlled based on the position of the moving object or of the player character in possession of the moving object such that the selected player character approaches the moving object or the player character in possession of the moving object. It is determined whether or not the moving object or the player character in possession of the moving object is located within the restriction region. In a case where the moving object or the player character in possession of the moving object is located within the restriction region, execution of the above-mentioned positional control over the selected player characters is restricted. Further, according to the present invention, the size of the restriction region changes based on the game situation information. According to the present invention, in a case where any one of the player characters belonging to one team is in possession of the moving object, it is possible to achieve a reduction in processing load relating to the control of the player characters belonging to the other team.

Further, according to an aspect of the present invention, the restriction region control means may include: means for storing data obtained by associating the game situation information with restriction region information related to the size of the restriction region; and means for controlling the size of the restriction region based on the restriction region information associated with the game situation information.

Further, according to another aspect of the present invention, the game device may further include: elapsed time determining means for determining whether or not a time elapsed since the moving object or the player character in possession of the moving object became located within the restriction region has become a predetermined time or longer; and restriction removing means for removing the restriction imposed by the restricting means in a case where the time elapsed since the moving object or the player character in possession of the moving object became located within the restriction region has become the predetermined time or longer.

Further, according further another aspect of the present invention, the restriction region control means may include: means for controlling the size of the restriction region based on a time elapsed since the moving object or the player character in possession of the moving object became located within the restriction region.

BEST MODE FOR CARRYING OUT THE INVENTION

Hereinafter, a detailed description is given of an example of an embodiment of the present invention with reference to the accompanying drawings. A game device according to the embodiment of the present invention is implemented by, for example, a consumer game machine (stationary type game machine), a portable game machine, a mobile phone, a personal digital assistant (PDA), or a personal computer. Herein, a description is given of a case where the game device according to the embodiment of the present invention is implemented by a consumer game machine.

Figure 1:
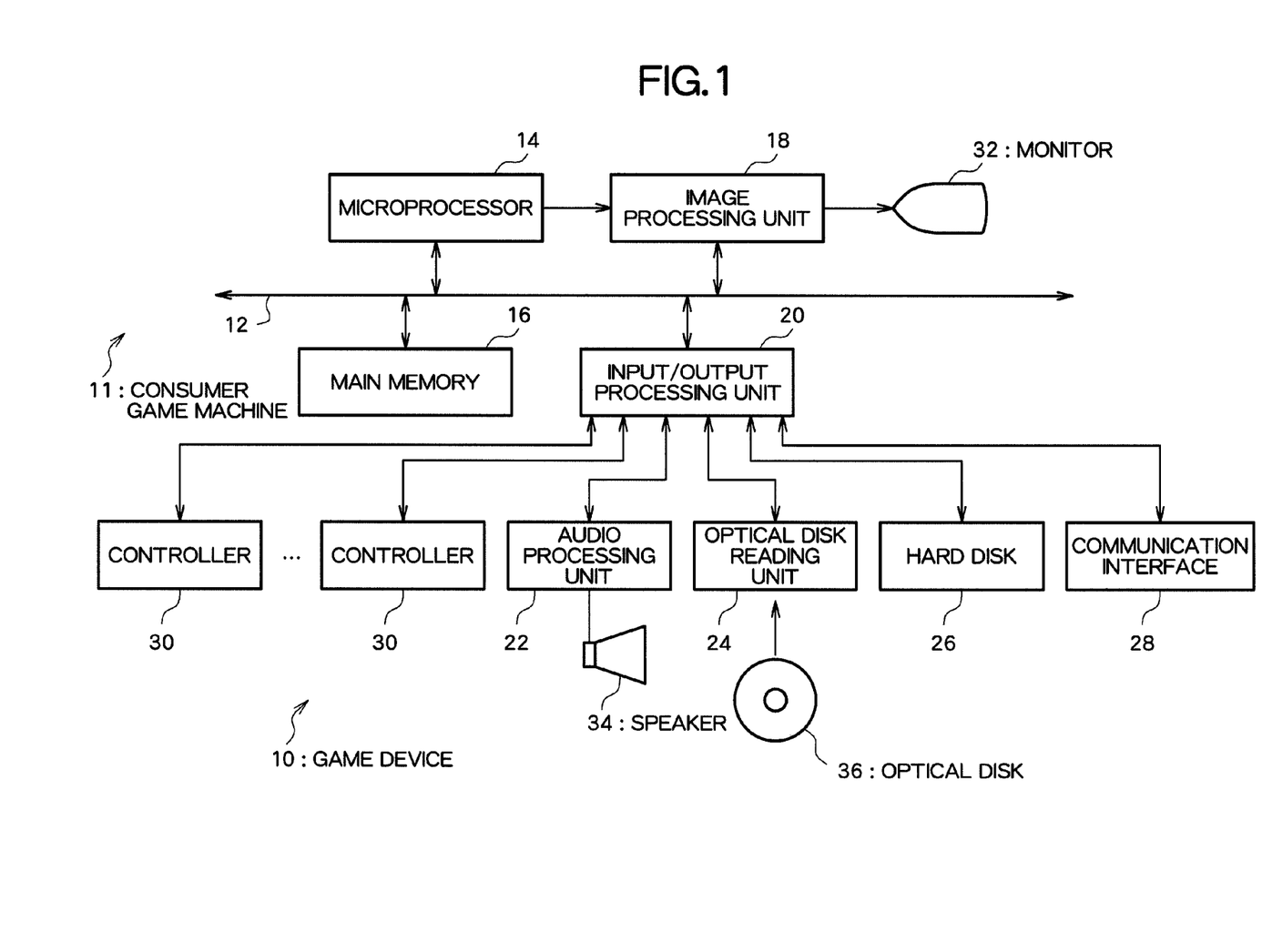
FIG. 1 is a diagram illustrating a hardware configuration of a game device according to an embodiment of the present invention.

FIG. 1 is a diagram illustrating an overall configuration of the game device according to the embodiment of the present invention. A game device 10 illustrated in FIG. 1 includes a consumer game machine 11, a monitor 32, a speaker 34, and an optical disk 36 (information storage medium). The monitor 32 and the speaker 34 are connected to the consumer game machine 11. For example, a household television set is used as the monitor 32, a speaker built into the household television set is used as the speaker 34.

The consumer game machine 11 is a well-known computer game system. The consumer game machine 11 includes a bus 12, a microprocessor 14, a main memory 16, an image processing unit 18, an input/output processing unit 20, an audio processing unit 22, an optical disk reading unit 24, a hard disk 26, a communication interface 28, and controllers 30. The constituent components other than the controllers 30 are accommodated in a casing of the consumer game machine 11.

The microprocessor 14 controls each of the sections of the consumer game machine 11 based on an operating system stored in a ROM (not shown) and on a program read out from the optical disk 36 or the hard disk 26. The main memory 16 includes, e.g., a RAM. The program and data each read out from the optical disk 36 or the hard disk 26 are written into the main memory 16 as necessary. The main memory 16 is also used as a working memory of the microprocessor 14. The bus 12 is for exchanging addresses and data among the sections of the consumer game machine 11. The microprocessor 14, the main memory 16, the image processing unit 18, and the input/output processing unit 20 are connected via the bus 12 so as to communicate data with one another.

The image processing unit 18 includes a VRAM, and renders a game screen in the VRAM based on image data sent from the microprocessor 14. Then, the image processing unit 18 converts the game screen rendered in the VRAM into video signals and outputs the video signals to the monitor 32 at a predetermined timing.

The input/output processing unit 20 is an interface for the microprocessor 14 to access the audio processing unit 22, the optical disk reading unit 24, the hard disk 26, the communication interface 28, and the controllers 30. The audio processing unit 22 includes a sound buffer, reproduces various audio data such as game music, a game sound effect, or a message read out from the optical disk 36 or the hard disk 26 to the sound buffer, and outputs the audio data from the speaker 34.

The communication interface 28 is an interface for connecting the consumer game machine 11 to a communication network such as the Internet in a wired or wireless manner.

The optical disk reading unit 24 reads the program or data recorded on the optical disk 36. In this case, the optical disk 36 is employed for providing the program or data to the consumer game machine 11, but any other information storage media such as a memory card may also be used. Further, the program or data may also be provided to the consumer game machine 11 from a remote location via a data communication network such as the Internet. The hard disk 26 is a general hard disk device (auxiliary storage device).

The controllers 30 are versatile operation input units for a user to input various game operations. A plurality of the controllers 30 can be connected to the consumer game machine 11. The input/output processing unit 20 scans a state of each of the controllers 30 at predetermined intervals (e.g., every $1/60^{th}$ of a second), and passes an operation signal indicative of the result of scanning to the microprocessor 14 via the bus 12. The microprocessor 14 determines a game operation made by a user based on the operation signal. Note that the controllers 30 may be wire connected or wirelessly connected to the consumer game machine 11.

In the game device 10, a soccer game which simulates a soccer match between a first team and a second team, e.g., is executed. Hereinbelow, a description is given on the assumption that the first team is operated by the user, and the second team is operated by the computer. Note that the first team may be operated by the computer. Alternatively, the second team may be operated by another user. The soccer game is implemented by executing the program read out from the optical disk 36 or the hard disk 26.

Figure 2:
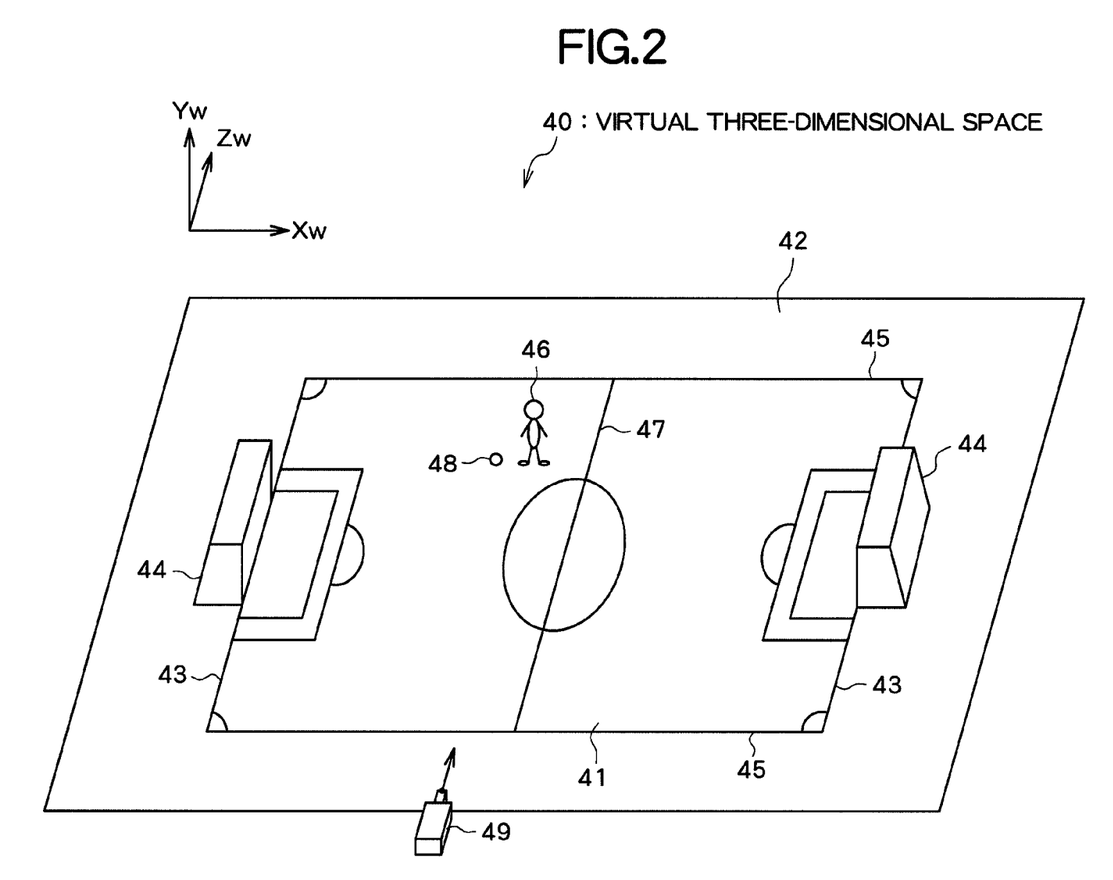
FIG. 2 is a diagram illustrating an example of a virtual three-dimensional space.

In order to implement the above-mentioned soccer game, a virtual three-dimensional space (game space) is built in the main memory 16. FIG. 2 illustrates an example of the virtual three-dimensional space. As illustrated in FIG. 2, a field object representing a soccer field is located in a virtual three-dimensional space 40. For example, goal lines 43 (end lines), touch lines 45 (side lines), and a half-way line 47 are defined on the field object 42. A soccer match is played within a pitch 41 which is an area surrounded by the goal lines 43 and the touch lines 45. Goal objects 44 each representing a goal, player objects 46 (player characters) representing soccer players, and a ball object 48 representing a soccer ball (moving object) are located on the field object 42. Although not shown in FIG. 2, eleven player objects 46 which belong to the first team and eleven player objects 46 which belong to the second team are located on the field object 42.

One of the goal objects 44 is associated with the first team while the other goal object 44 is associated with the second team. If the ball object 48 moves in the goal object 44 associated with one team, a scoring event for the other team occurs. Hereinbelow, a region between the goal line 43 corresponding to the goal object 44 of the first team and the halfway line 47 is referred to as the first team's "own half". Likewise, a region between the goal line 43 corresponding to the goal object 44 of the second team and the halfway line 47 referred to as the second team's "own half".

Further, a virtual camera 49 (viewpoint) is set in the virtual three-dimensional space 40. For example, the virtual camera 49 moves in the virtual three-dimensional space 40 according to the movement of the ball object 48. A game screen representing the virtual three-dimensional space 40 viewed from the virtual camera 49 is displayed on the monitor 32.

If a player object 46 and the ball object 48 come close to each other, the player object 46 and the ball object 48 are associated with each other under a predetermined condition. In this case, the ball object 48 moves according to the movement of the player object 46. This state is represented by a dribbling action of the player object 46. The state where the ball object 48 is associated with the player object 46 is hereinafter referred to as "state where the player object 46 is in possession of the ball object 48".

Further, in a state where one of the player objects 46 is in possession of the ball object 48, if another player object 46 approaches the ball object 48, the other player object 46 and the ball object 48 are associated with each other under a predetermined condition. In this manner, the player object 46 snatches the ball object 48 possessed by another player object 46.

In the soccer game described above, when any one of the player objects 46 belonging to one team is in possession of the ball object 48, the user or the computer operating the other team is allowed to give a "press defense" instruction. If the user or the computer has given the "press defense" instruction, one or more player objects 46 selected from among the player objects 46 belonging to the team operated by the user or the computer perform "press defense". Here, "press defense" is a defensive operation, such as getting closer to the player object 46 in possession of the ball object 48 (or to the ball object 48), marking the player object 46 in possession of the ball object 48, and putting pressure on the player object 46 in possession of the ball object 48. Hereinbelow, a description is given of technology for achieving a reduction in processing load relating to the execution of such "press defense".

Figure 3:
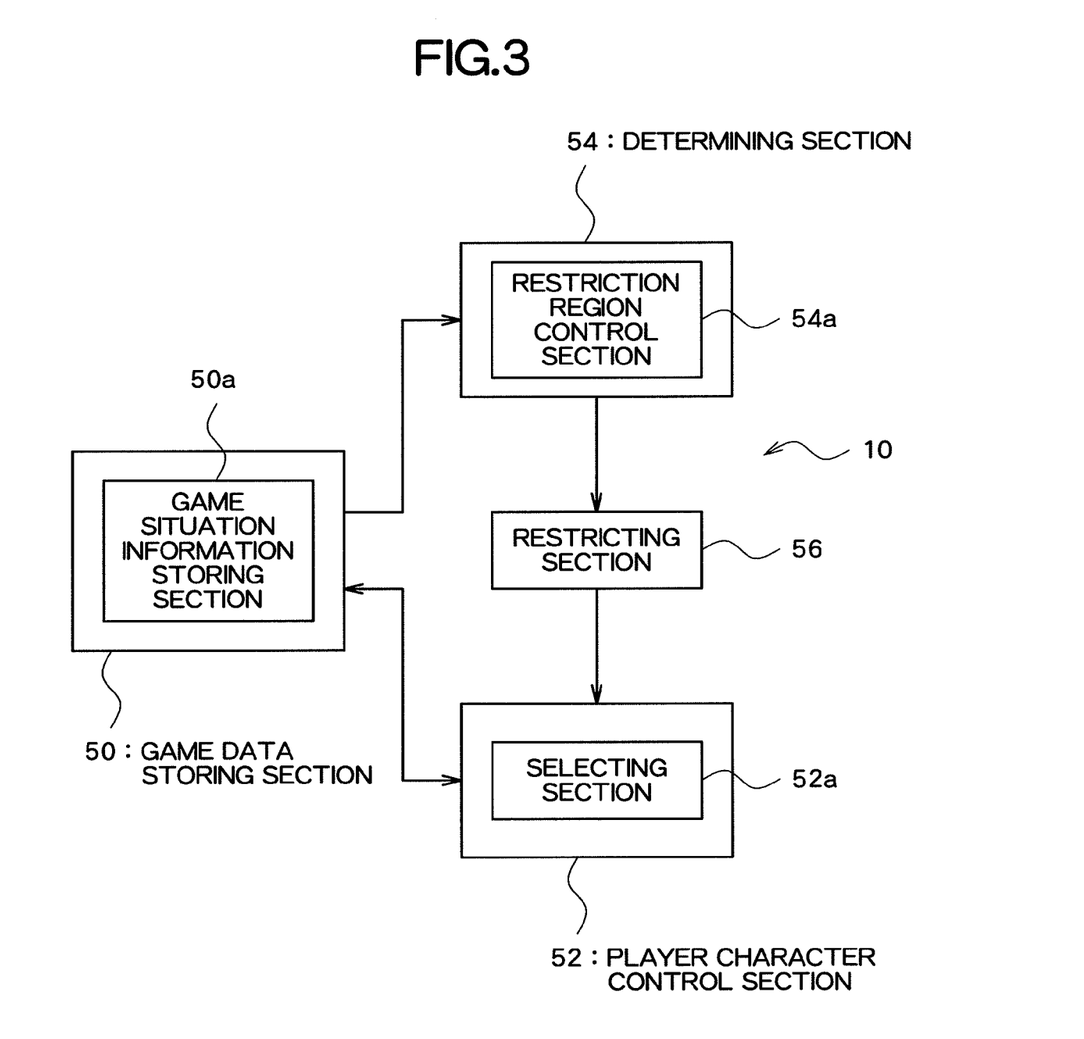
FIG. 3 is a functional block diagram of a game device according to the embodiment.

FIG. 3 is a functional block diagram primarily illustrating, of functions implemented by the game device 10, functions relating to the execution of "press defense". As illustrated in FIG. 3, the game device 10 includes a game data storing section 50, a player character control section 52, a determining section 54, and a restricting section 56. Those functional blocks are implemented through execution of the program by the microprocessor 14.

The game data storing section 50 is implemented by, e.g., the main memory 16, the hard disk 26, or the optical disk 36. The game data storing section 50 stores game data for executing a soccer game. For example, the game data storing section 50 stores data indicating a state (such as position, posture, or moving direction) of the player object 46, data indicating a state (such as position or moving direction) of the ball object 48, and data indicating a state (position or visual line direction) of the virtual camera 49. In addition, the game data storing section 50 also stores data indicating, e.g., the player object 46 in possession of the ball object 48.

The game data storing section 50 includes a game situation information storing section 50a. The game situation information storing section 50a stores game situation information indicating a game situation. For example, the game situation information contains score information indicating respective scores of the first team and the second team. For example, the game situation information also contains information indicating respective ball possession rates of the first team and the second team, information indicating the respective numbers of free kicks, corner kicks, and shots made by the first team and the second team, and information indicating the respective numbers of yellow cards and red cards given against the first team and the second team. The game situation information may also be referred to as information indicating which one of the first team and the second team is winning.

The player character control section 52 is implemented mainly by the microprocessor 14. The player character control section 52 includes a selecting section 52a. In a state where any one of the player objects 46 which belong to one team is in possession of the ball object 48, if the user or the computer operating the other team has given a "press defense" instruction, the selecting section 52*a* selects one or more player objects 46 from among the player objects 46 which belong to the other team. For example, the selection of one or more the player objects 46 is automatically executed based on the position of each of the player objects 46 which belong to the team operated by the user or the computer that has given the "press defense" instruction and on the position of the ball object (or of the player object 46 in possession of the ball object 48). For example, the player object 46 closest to the position of the ball object 48 (or of the player object 46 in possession of the ball object 48) is selected. Note that in a case where the user has given the "press defense" instruction, the selection of one or more the player objects 46 may also be executed in accordance with a selective operation made by the user. In this case, the one or more player objects 46 selected by the user perform "press defense".

The player character control section 52 causes the player object 46 selected by the selecting section 52*a* to perform "press defense". That is, the player character control section 52 controls the position of the player object 46 selected by the selecting section 52*a* based on the position of the ball object 48 (or of the player object 46 in possession of the ball object 48) such that the player object 46 selected by the selecting section 52*a* approaches the ball object 48 (or the player object 46 in possession of the ball object 48).

The determining section 54 is implemented mainly by the microprocessor 14. The determining section 54 determines whether or not the player object 46 in possession of the ball object 48 (or the ball object 48) is located within the restriction region.

Here, a description is given of the restriction region. As is described later, the restriction region is a region where the execution of "press defense" is restricted. In the case of this embodiment, there are set a first restriction region where the execution of "press defense" by the first team is restricted, and a second restriction region where the execution of "press defense" by the second team is restricted. In other words, the first restriction region is a region where the execution of "press defense" against the second team is restricted, and the second restriction region is a region where the execution of "press defense" against the first team is restricted.

Figure 4:
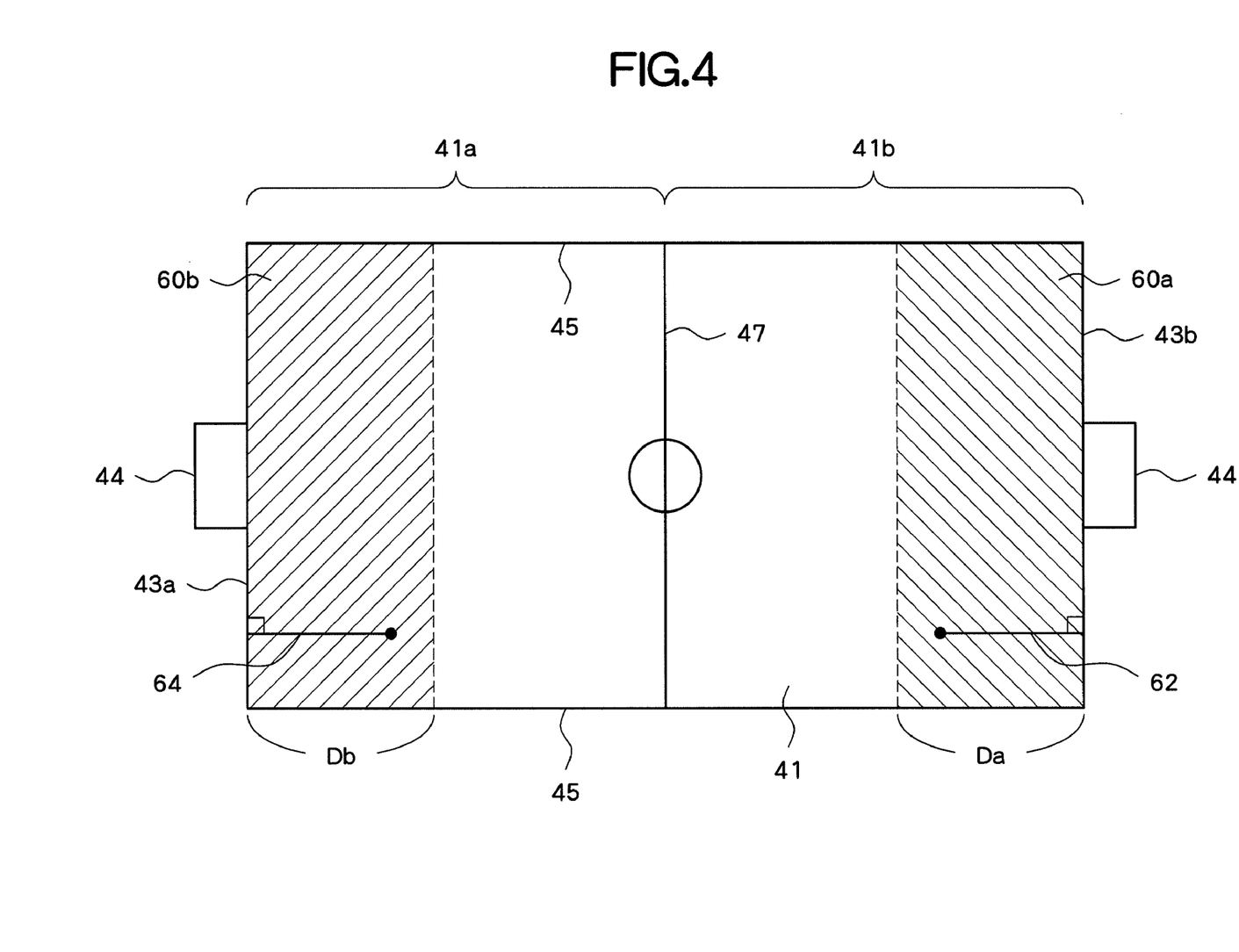
FIG. 4 is a diagram illustrating an example of a restriction region.

FIG. 4 is a diagram illustrating an example of the first restriction region and the second restriction region. In FIG. 4, reference numeral 41*a* denotes the first team's "own half, and reference numeral 43*a* denotes a goal line located within the first team's own half 41*a*. Likewise, reference numeral 41*b* denotes the second team's "own half", and reference numeral 43*b* denotes a goal line located within the second team's own half 41*b*. As illustrated in FIG. 4, a first restriction region 60*a* is set within the second team's own half 41*b*. The first restriction region 60*a* is a region within the pitch 41 in which the length of a perpendicular 62 to the goal line 43*b* is equal to or smaller than a first reference distance Da. Further, a second restriction region 60*b* is set within the first team's own half 41*a*. The second restriction region 60*b* is a region within the pitch 41 in which the length of a perpendicular 64 to the goal line 43*a* is equal to or smaller than a second reference distance Db.

For example, in a state where any one of the player objects 46 which belong to the first team is in possession of the ball object 48, if the computer operating the second team has given a "press defense" instruction, the determining section 54 determines whether or not the player object 46 in possession of the ball object 48 (or the ball object 48) is located within the second restriction region 60*b*. Further, for example, in a state where any one of the player objects 46 which belong to the second team is in possession of the ball object 48, if the user operating the first team has given a "press defense" instruction, the determining section 54 determines whether or not the player object 46 in possession of the ball object 48 (or the ball object 48) is located within the first restriction region 60*a*.

The determining section 54 includes a restriction region control section 54*a*. The restriction region control section 54*a* changes the size of the restriction region based on the game situation information. For example, the restriction region control section 54*a* stores data obtained by associating the game situation information with the restriction region information related to the size of the restriction region. The restriction region control section 54*a* acquires the restriction region information associated with the current game situation information, based on the data, and controls the size of the restriction region based on the restriction region information. The data described above may be data in the form of a table, or data in the form of a numerical expression. Alternatively, the data described above may also be stored as a part of the program. For example, the data described above is a table obtained by associating a game situation condition related to the game situation information with the restriction region information. In this case, the restriction region control section 54*a* controls the size of the restriction region based on the restriction region information associated with the game situation condition satisfied by the current game situation information.

Figure 5:
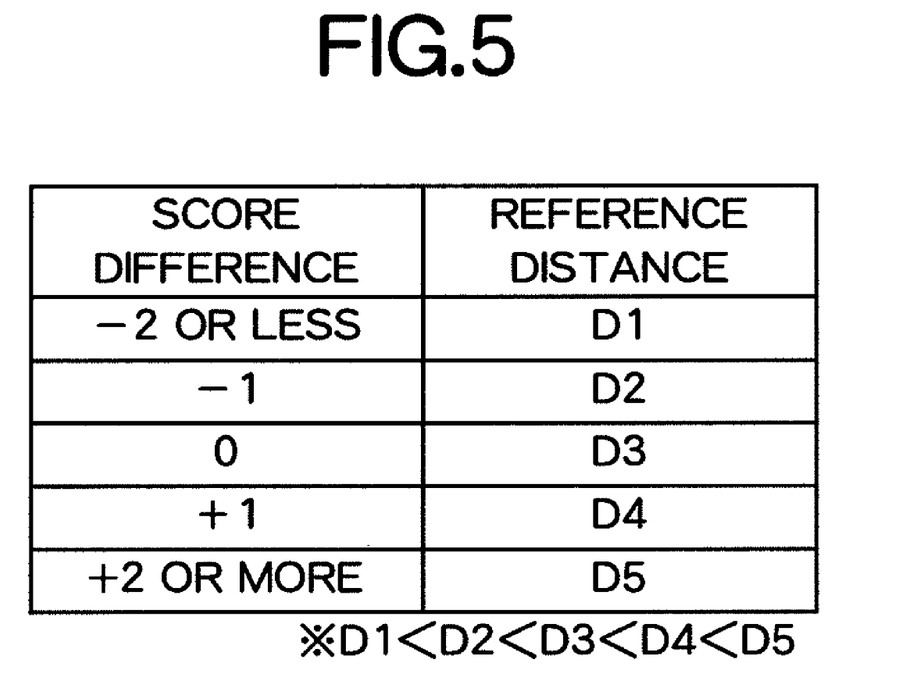
FIG. 5 is a diagram illustrating an example of reference distance data.

In the case of this embodiment, the restriction region control section 54*a* controls the respective sizes of the first restriction region 60*a* and the second restriction region 60*b* by changing the first reference distance Da and the second reference distance Db based on the game situation information. FIG. 5 illustrates an example of reference distance data stored in the restriction region control section 54*a*. The reference distance data illustrated in FIG. 5 is data obtained by associating a "score difference" with the "reference distance". The "score difference" is the difference between the score of the team operated by the user or the computer that has given a "press defense" instruction and the score of the opponent team (i.e., the team in possession of the ball object 48). Note that a case where the "score difference" has a negative numerical value is a case where the score of the team operated by the user or the computer that has given the "press defense" instruction is lower than the score of the opponent team. A case where the "score difference" has a positive numerical value is a case where the score of the team operated by the user or the computer that has given the "press defense" instruction is higher than the score of the opponent team. The restriction region control section 54*a* controls the first reference data Da and the second reference distance Db based on the reference distance data. Note that, in FIG. 5, D1 to D5 have relationship given by D1<D2<D3<D4<D5.

Here, a case is assumed where, in a state where any one of the player objects 46 which belong to the first team is in possession of the ball object 48, the computer operating the second team has given a "press defense" instruction. For example, when the score of the second team is higher than the score of the first team by one point, the second reference distance Db is set to D4, and when the score of the second team is lower than the score of the first team by one point, the second reference distance Db is set to D2. Thus, when the second team is winning, the second reference distance Db is set relatively long, and the second restriction region 60*b* is set relatively large in size. On the other hand, when the second team is losing, the second reference distance Db is set relatively short, and the second restriction region 60*b* is set relatively small in size. Further, for example, when the score of the second team is higher than the score of the first team by two or more points, the second reference distance Db is set to the distance (D5) longer than the distance (D4) which is set when the score of the second team is higher than the score of the first team by one point. In this manner, when the second team is winning, the second reference distance Db is set longer in accordance with the degree of winning, and consequently, the second restriction region 60b is set larger. Further, for example, when the score of the second team is lower than the score of the first team by two points or more, the second reference distance Db is set to the distance (D1) shorter than the distance (D2) which is set when the score of the second team is lower than the score of the first team by one point. In this manner, when the second team is losing, the second reference distance Db is set shorter in accordance with the degree of losing, and consequently, the second restriction region 60b is set smaller.

Note that the restriction region control section 54a may also store respective reference distances for three cases which are (1) the case where the team operated by the user or the computer that has given a "press defense" instruction is leading the opponent team, (2) the case where the team operated by the user or the computer that has given a "press defense" instruction is being led by the opponent team, and (3) the case where the team operated by the user or the computer that has given a "press defense" instruction has the same score as that of the opponent team. Further, the restriction region control section 54a may also store the coordinates of the vertices of the restriction region, instead of the reference distance, as the restriction region information.

Here, the description has been given of the example in which the first restriction region 60a and the second restriction region 60b are controlled based on the respective scores of the both teams. However, each of the first restriction region 60a and the second restriction region 60b may be controlled based only on the score of one of the teams. For example, the second restriction region 60b may be controlled based only on the score of the second team. For example, the second restriction region 60b may be increased in size as the score of the second team increases. Alternatively, the second restriction region 60b may be controlled based only on the score of the first team. In this case, the second restriction region 60b may be reduced in size as the score of the first team increases.

Further, the restriction region control section 54a may use another game situation information instead of the score information. In this case as well, the second restriction region 60b may be set relatively large in size when the second team is assumed to be winning, and the second restriction region 60b may be set relatively small in size when the second team is assumed to be losing.

The restricting section 56 is implemented mainly by the microprocessor 14. The restricting section 56 restricts execution of the control by the player character control section 52 based on the result of determination by the determining section 54.

There is assumed the case where, in the state where any one of the player objects 46 which belong to the first team is in possession of the ball object 48, the computer operating the second team has given a "press defense" instruction. In this state, in a case where it is determined by the determining section 54 that the player object 46 in possession of the ball object 48 (or the ball object 48) is located within the second restriction region 60b, the restricting section 56 imposes a restriction on the control to be executed by the player character control section 52. In this case, the execution of "press defense" by the second team is inhibited. That is, the player objects 46 selected by the selecting section 52a do not move toward the ball object 48, and do not approach the ball object 48.

There is assumed a case where, in a state where any one of the player objects 46 which belong to the second team is in possession of the ball object 48, the user operating the first team has given a "press defense" instruction. In this state, in a case where it is determined by the determining section 54 that the player object 46 in possession of the ball object 48 (or the ball object 48) is located within the first restriction region 60a, the restricting section 56 imposes a restriction on the control to be executed by the player character control section 52. In this case, the execution of "press defense" by the first team is inhibited. That is, the player objects 46 selected by the selecting section 52a do not move toward the ball object 48, and do not approach the ball object 48.

As described above, in the game device 10, in a case where the player object 46 in possession of the ball object 48 is located within the restriction region of the team operated by the user or the computer that has given a "press defense" instruction, the execution of "press defense" is inhibited. As a result, processing load relating to the execution of "press defense" is reduced.

In particular, in the game device 10, a reduction in processing load relating to execution of "press defense" is effected in accordance with the game situation.

Here, a case is assumed where, in a state where the score of the second team is higher than the score of the first team, the computer operating the second team has given a "press defense" instruction. In this case, the second team is leading the first team (the second team is winning the first team), and hence it can be considered that the second team has a relatively low need to positively snatch the ball object 48 possessed by the first team. Therefore, it can be considered that even when the player object 46 of the first team in possession of the ball object 48 is positioned relatively far from the goal line 43a in the first team's own half 41a, the second team has a relatively low need to perform "press defense". In this regard, in the game device 10, when the score of the second team is higher than the score of the first team, the second reference distance Db is set relatively long, and the second restriction region 60b is set relatively large in size. As a result, even when the player object 46 of the first team in possession of the ball object 48 is positioned relatively far from the goal line 43a of the first team's own region 41a, the execution of "press defense" is inhibited.

There is also assumed a case where, in a state where the score of the second team is lower than the score of the first team, the computer operating the second team has given a "press defense" instruction. In this case, the second team is being led by the first team (the second team is losing to the first team), and hence it can be considered that the second team has a relatively high need to positively snatch the ball object 48 possessed by the first team. Therefore, it can be considered that even when the player object 46 of the first team in possession of the ball object 48 is positioned relatively close to the goal line 43a in the first team's own half 41a, the second team has a relatively high need to perform "press defense". In this regard, in the game device 10, when the score of the second team is lower than the score of the first team, the second reference distance Db is set relatively short, and the second restriction region 60b is set relatively small in size. As a result, even when the player object 46 of the first team in possession of the ball object 48 is positioned relatively close to the goal line 43a in the first team's own half 41a, "press defense" is performed.

Figure 6:
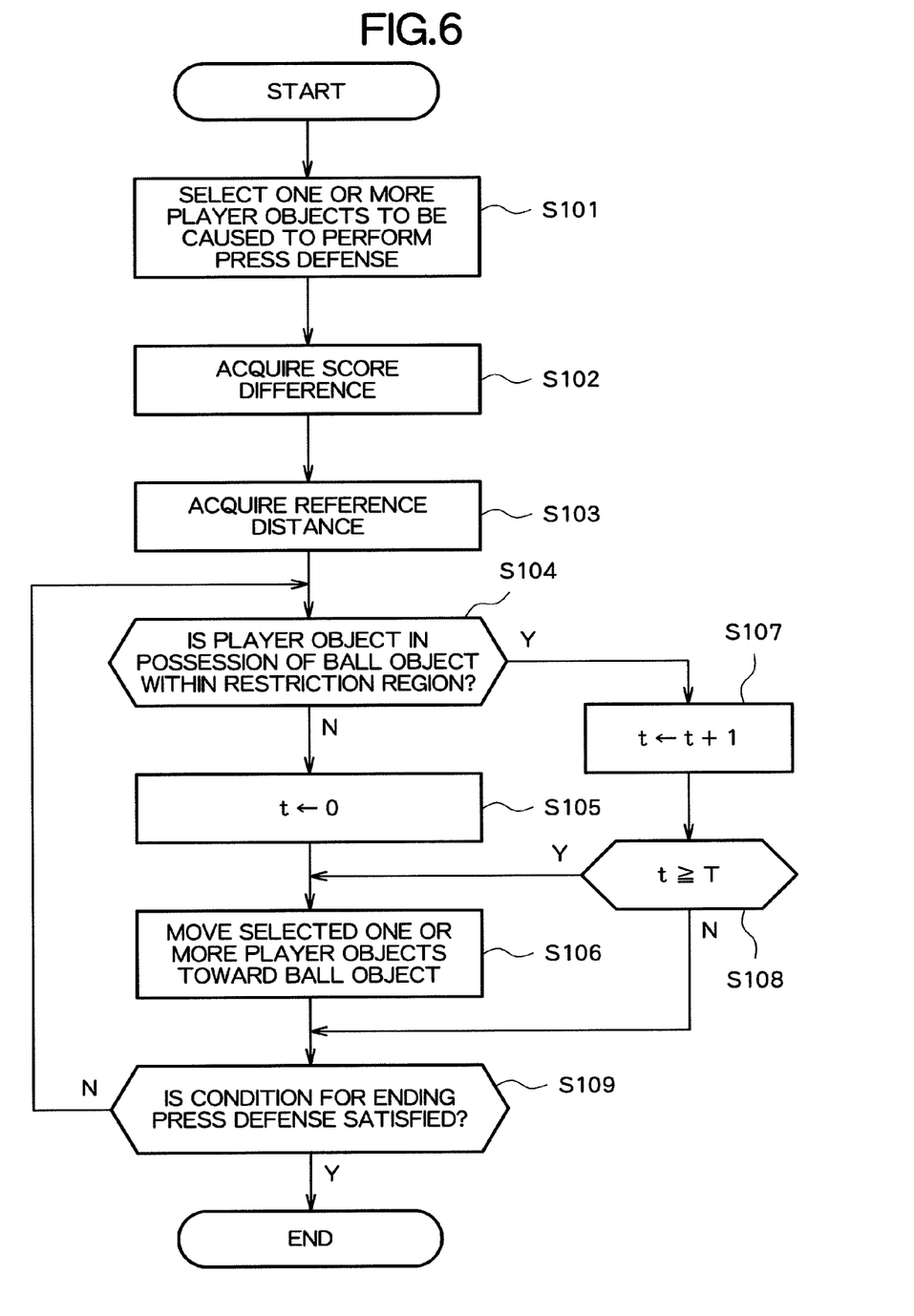
FIG. 6 is a flow chart illustrating processing executed by the game device.

Next, a description is given of processing executed by the game device 10 to implement the functional blocks described above. FIG. 6 is a flow chart illustrating processing executed in a case where, in a state where any one of the player objects 46 belonging to one team is in possession of the ball object 48, the user or the computer operating the other team has given a "press defense" instruction. Here, the description is given using, as an example, the case where in the state where any one of the player objects 46 which belong to the first team is in possession of the ball object 48, the computer operating the second team has given the "press defense" instruction. The microprocessor 14 executes the processing illustrated in FIG. 6 in accordance with the program stored in the optical disk 36 or the hard disk 26.

As illustrated in FIG. 6, the microprocessor 14 (selecting section 52a) first selects one or more player objects 46 which are caused to perform "press defense" from among the player objects 46 which belong to the second team (S101). For example, the player object 46 closest to the ball object 48 (or the player object 46 in possession of the ball object 48) is selected. Note that, in the case where the user operating the first team has given the "press defense" instruction, the player object 46 may be selected from among the player objects 46 which belong to the first team in accordance with a selecting operation by the user.

After that, the microprocessor 14 (restriction region control section 54a) acquires the score difference between the first team and the second team (S102). The microprocessor 14 reads out the score (P1) of the first team and the score (P2) of the second team, and calculates the score difference $\Delta P = P2 - P1$. After that, the microprocessor 14 (restriction region control section 54a) reads out the reference distance corresponding to the score difference $\Delta P$ acquired in S102, from the reference distance table (S103). Note that the description is given here using, as an example, the case where the computer operating the second team has given a "press defense" instruction, and hence the score difference $\Delta P = P2 - P1$ is calculated in the processing in S102. In the case where the user operating the first team has given a "press defense" instruction, the score difference $\Delta P = P1 - P2$ is calculated in the processing in S102.

After that, the processing (S104 to S109) described below is repeatedly executed at each predetermined time interval (which is $1/60^{th}$ of a second in this embodiment). In parallel with the processing in S104 to S109, processing for controlling the player objects 46 other than the one or more player objects 46 selected in S101 and the ball object 48 is executed, though omitted in FIG. 6.

First, the microprocessor 14 (determining section 54) identifies the second restriction region 60b based on the reference distance read out in S103, and determines whether or not the player object 46 in possession of the ball object 48 (or the ball object 48) is located within the second restriction region 60b (S104). Note that the description is given herein using, as an example, the case where the computer operating the second team has given the "press defense" instruction, and hence it is determined whether or not the player object 46 in possession of the ball object 48 is located within the second restriction region 60b. In the case where the user operating the first team has given the "press defense" instruction, it is determined whether or not the player object 46 in possession of the ball object 48 is located within the first restriction region 60a.

If the player object 46 in possession of the ball object 48 is not located within the second restriction region 60b, the microprocessor 14 initializes the value of a variable t to a predetermined initial value (0) (S105). The variable t is used to measure a time elapsed since the player object 46 in possession of the ball object 48 (or the ball object 48) became located within the second restriction region 60b. The variable t is also initialized to the initial value (0) when the player object 46 in possession of the ball object 48 has changed to another of the player objects 46.

After that, the microprocessor 14 (player character control section 52) moves the player object 46 selected in S101 toward the ball object 48 (or the player object 46 in possession of the ball object 48) (S106). In this case, the position of the player object 46 selected in S101 is updated to a position displaced from the current position toward the position of the ball object 48 by a movement distance corresponding to predetermined time ($1/60^{th}$ of a second). That is, the microprocessor 14 causes the player object 46 selected in S101 to perform "press defense".

On the other hand, if the player object 46 in possession of the ball object 48 is located within the second restriction region 60b (S104: Y), the microprocessor 14 (elapsed time determining means) adds 1 to the value of the variable t (S107), and determines whether or not the value of the variable t is equal to or larger than the constant T (S108). The constant T is a numerical value representing a predetermined time (e.g., 10 seconds) in units of $1/60^{th}$ of a second.

A case where the value of the variable t is less than T is a case where the time elapsed since the player object 46 in possession of the ball object 48 (or the ball object 48) became located within the second restriction region 60b is less than a predetermined time (e.g., 10 seconds). In this case, the microprocessor 14 (restricting section 56) does not execute the processing in S106. That is, the microprocessor 14 does not cause the player object 46 selected in S101 to perform "press defense".

On the other hand, a case where the value of the variable t is equal to or larger than T is a case where the time elapsed since the player object 46 in possession of the ball object 48 (or the ball object 48) became located within the second restriction region 60b is equal to or larger than a predetermined time (e.g., 10 seconds). In this case, the microprocessor 14 (player character control section 52 and a restriction removing means) moves the player object 46 selected in S101 toward the ball object 48 (S106). That is, the microprocessor 14 causes the player object 46 selected in S101 to perform "press defense".

As described above, according to the game device 10, in a case where the player object 46 in possession of the ball object 48 has been continuously located within the restriction region for a predetermined time (e.g., 10 seconds) or longer, i.e., in a case where execution of "press defense" has been continuously inhibited for a predetermined time or longer, "press defense" is performed irrespective of whether or not the player object 46 in possession of the ball object 48 is located within the restriction region. If a state where "press defense" is not performed has continued over a relatively long period, the user may be given an impression that the movements of the player objects 46 are artificial. In this regard, it is intended that such a problem does not occur according to the game device 10.

After the processing in S106 is executed, the microprocessor 14 determines whether or not a condition for ending "press defense" has been satisfied (S109). Note that the processing in this step is also executed in a case where it is determined that the value of the variable t is less than T (S108: N). Here, a case where the condition for ending "press defense" is satisfied is, e.g., a case where an instruction to stop "press defense" has been given, or a case where the player object 46 in possession of the ball object 48 has changed to another of the player objects 46. If the condition for ending "press defense" is not satisfied, the microprocessor 14 executes the processing in S104 to S109 again.

The game device 10 described above allows a reduction in processing load relating to execution of "press defense". That is, the game device 10 allows a reduction in processing load relating to the control of the player objects 46 belonging to one team, in a case where any one of the player objects 46 belonging to another team is in possession of the ball object 48. The game device 10 also allows a reduction in processing load as described above to be effected in accordance with the game situation.

Note that the present invention is not limited to the embodiment described above.

For example, the restriction region control section 54a may also control the size of the restriction region based on the time elapsed since the player object in possession of the ball object 48 (or the ball object 48) became located within the restriction region. Here, a description is given by assuming a case where, in a state where any one of the player objects 46 belonging to the first team is in possession of the ball object 48, the computer operating the second team has given a "press defense" instruction.

For example, if the value of the variable t is determined to be equal to or larger than T in S108 of FIG. 6, the microprocessor 14 (restriction region control section 54a) may also set the second reference distance Db to 0. That is, if the time elapsed since the player object 46 in possession of the ball project 48 became located within the second restriction region 60b is equal to or larger than a predetermined time (e.g., 10 seconds), the restriction on execution of "press defense" may also be cancelled by eliminating the second restriction region 60b.

Alternatively, the restriction region control section 54a may also reduce the size of the second restriction region 60b in stages based on the time elapsed since the player object 46 in possession of the ball object 48 (or the ball object 48) became located within the second restriction region 60b. For example, the restriction region control section 54a stores data obtained by associating a combination of the game situation information and the above-mentioned elapsed time with the restriction region information (e.g., the second reference distance Db) related to the size of the second restriction region 60b. Then, the restriction region control section 54a acquires the restriction region information corresponding to the combination of the current game situation information and the elapsed time, and controls the size of the second restriction region 60b based on the restriction region information.

As described above, if the state where "press defense" is not executed has continued over a relatively long period, the user may be given an impression that the movements of the player objects 46 are artificial. In this regard, by following a procedure as described above, it is possible to prevent the occurrence of such a problem.

Otherwise, for example, the size of the restriction region may also be changed based on the strength or strategy of at least one of the teams. For example, the size of the second restriction region 60b may also be changed based on the strength of the second team. For example, in a case where the level of the computer operating the second team can be selected from among a plurality of levels, the size of the second restriction region 60b may also be changed based on the level of the computer operating the second team. Alternatively, for example, in a case where an ability parameter showing the level of ability is set to the second team, the size of the second restriction region 60b may also be changed based on the ability parameter set to the second team. Note that in a case where the ability parameter showing the level of ability is set to each of the player objects 46 belonging to the second team, the statistic value of the ability parameters of the player objects 46 belonging to the second team may also be used as the ability parameter of the second team.

Further, for example, the game executed on the game device 10 is not limited to the game in which a three-dimensional game space constituted of three coordinate elements is displayed on the game screen. The game executed on the game device 10 may be a game in which a two-dimensional game space constituted of two coordinate elements is displayed on the game screen. That is, the game executed on the game device 10 may be a game in which the positions and the like of a ball and a player character are managed by the two coordinate elements.

Further, for example, the game executed on the game device 10 may be a game played by two or more users. Further, for example, the game executed on the game device 10 is not limited to a soccer game. The game executed on the game device 10 may be a sports game other than a soccer game. The present invention is also applicable to, e.g., a game of basketball performed using a ball (moving object) and to a game of ice hockey performed using a puck (moving object).

Figure 7:
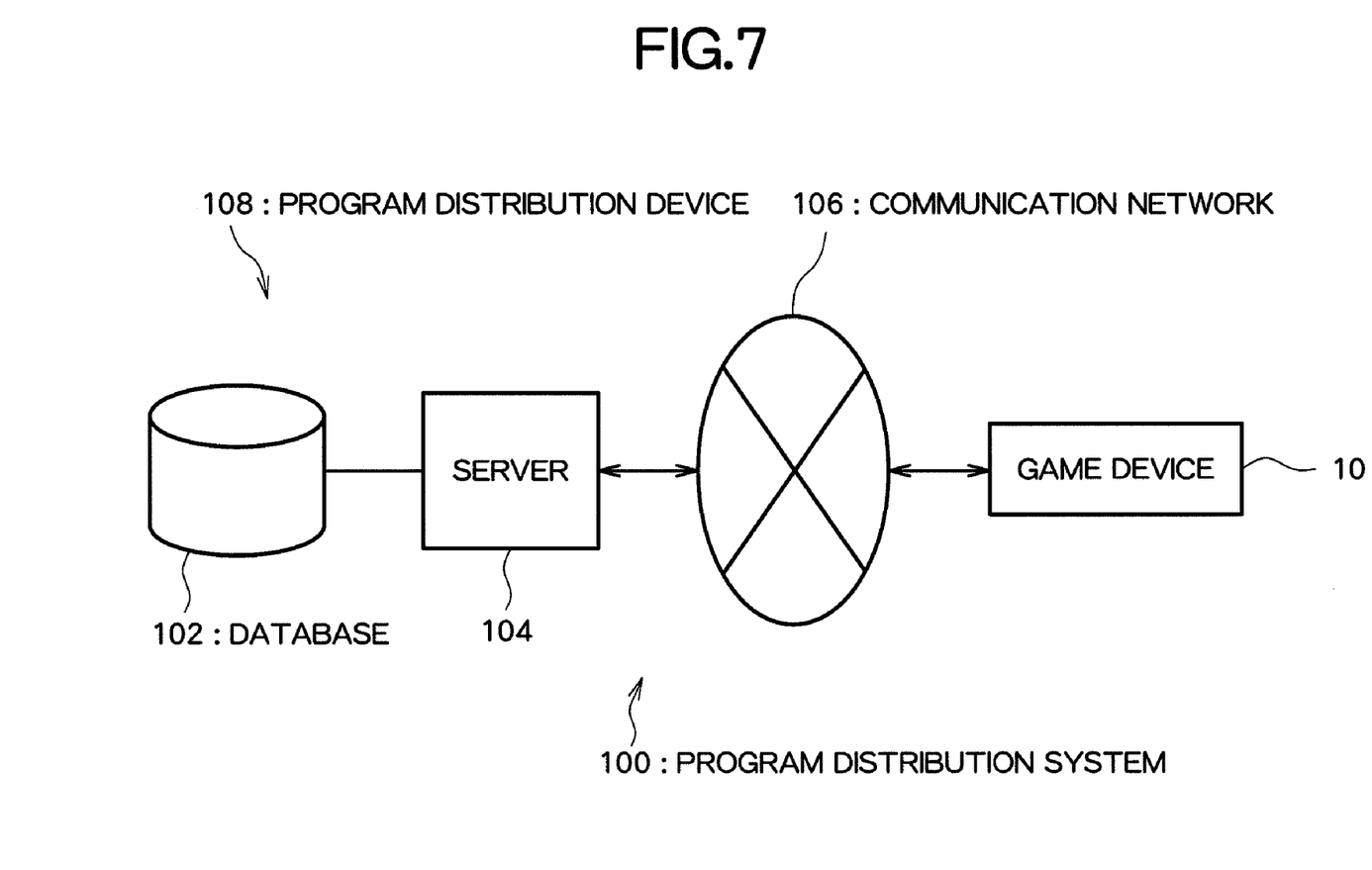
FIG. 7 is a diagram illustrating an overall configuration of a program distribution system according to another embodiment of the present invention.

Further, for example, in the above-mentioned description, the program is provided, via the optical disk 36 serving as an information storage medium, to the game device 10, but the program may be delivered to the game device 10 via a communication network. FIG. 7 is a diagram illustrating an overall configuration of a program distribution system using the communication network. With reference to FIG. 7, a description is given of a program distribution method according to the present invention. As illustrated in FIG. 7, the program distribution system 100 includes the game device 10, a communication network 106, and a program distribution device 108. The communication network 106 includes, for example, the Internet and a cable television network. The program distribution device 108 includes a game database 102 and a server 104. In the system, the same program as the program stored on the optical disk 36 is stored in the database (information storage medium) 102. Then, a demander uses the game device 10 to make a game delivery request, whereby the game delivery request is transferred to the server 104 via the communication network 106. Then, the server 104 reads out the program from the database 102 according to the game delivery request, and transmits the program to the game device 10. Here, the game delivery is performed in response to the game delivery request, but the server 104 may transmit the program one-sidedly. In addition, all of programs necessary to implement the game are not necessarily delivered at one time (delivered collectively), and necessary parts may be delivered (split and delivered) depending on which phase the game is in. By thus performing the game delivery via the communication network 106, the demander can obtain the program with ease.

The invention claimed is:

1. A game device for executing a game of a sport to be performed between a first team and a second team using a moving object, the game device comprising:
   game situation information storing means for storing game situation information indicating a game situation;
   selecting means for selecting one or more player characters from among player characters belonging to one team, in a case where any one of player characters belonging to another team is in possession of the moving object;
   player character control means for controlling a position of the player character selected by the selecting means, based on a position of the moving object or of the player character in possession of the moving object so that the player character selected by the selecting means approaches the moving object or the player character in possession of the moving object;

determining means for determining whether or not the moving object or the player character in possession of the moving object is located within a restriction region; and restricting means for imposing a restriction on the control to be executed by the player character control means, in a case where the moving object or the player character in possession of the moving object is located within the restriction region, wherein the determining means includes restriction region control means for changing a size of the restriction region based on the game situation information.

2. The game device according to claim 1, wherein the restriction region control means includes:

means for storing data obtained by associating the game situation information with restriction region information related to the size of the restriction region; and means for controlling the size of the restriction region based on the restriction region information associated with the game situation information.

3. The game device according to claim 1, further comprising:

elapsed time determining means for determining whether or not a time elapsed since the moving object or the player character in possession of the moving object became located within the restriction region has become a predetermined time or longer; and restriction removing means for removing the restriction imposed by the restricting means in a case where the time elapsed since the moving object or the player character in possession of the moving object became located within the restriction region has become the predetermined time or longer.

4. The game device according to claim 1, wherein the restriction region control means includes means for controlling the size of the restriction region based on a time elapsed since the moving object or the player character in possession of the moving object became located within the restriction region.

5. A control method of controlling a game device having a processor for executing a game of a sport to be performed between a first team and a second team using a moving object, the control method comprising:

a step of the processor reading out stored content stored in a game situation information storing means storing game situation information indicating a game situation;

a selecting step of the processor assisting in selecting one or more player characters from among player characters belonging to one team, in a case where any one of player characters belonging to another team is in possession of the moving object;

a player character control step of the processor assisting in controlling a position of the player character selected at the selecting step based on a position of the moving object or of the player character in possession of the moving object so that the player character selected at the selecting step approaches the moving object or the player character in possession of the moving object;

a determining step of the processor assisting in determining whether or not the moving object or the player character in possession of the moving object is located within a restriction region; and a restricting step of the processor assisting in imposing a restriction on the control to be executed at the player character control step, in a case where the moving object or the player character in possession of the moving object is located within the restriction region, wherein the determining step includes a restriction region control step of the processor assisting in changing a size of the restriction region based on the game situation information.

6. A non-transient computer readable information storage medium storing a program for causing a computer to function as a game device for executing a game of a sport to be performed between a first team and a second team using a moving object, the program causing the computer to function as:

game situation information section operative to store game situation information indicating a game situation;

selecting section operative to select one or more player characters from among player characters belonging to one team, in a case where any one of player characters belonging to another team is in possession of the moving object;

player character control section operative to control a position of the player character selected by the selecting section based on a position of the moving object or of the player character in possession of the moving object so that the player character selected by the selecting section approaches the moving object or the player character in possession of the moving object;

determining section operative to determine whether or not the moving object or the player character in possession of the moving object is located within a restriction region; and restricting section operative to impose a restriction on the control to be executed by the player character control section, in a case where the moving object or the player character in possession of the moving object is located within the restriction region, wherein the determining section includes restriction region control section operative to change a size of the restriction region based on the game situation information.

* * * * *